United States Patent
Su

(10) Patent No.: US 11,403,788 B2
(45) Date of Patent: Aug. 2, 2022

(54) IMAGE PROCESSING METHOD AND APPARATUS, ELECTRONIC DEVICE, AND STORAGE MEDIUM

(71) Applicant: BEIJING SENSETIME TECHNOLOGY DEVELOPMENT CO., LTD., Beijing (CN)

(72) Inventor: Liu Su, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/117,230

(22) Filed: Dec. 10, 2020

(65) Prior Publication Data
US 2021/0158579 A1 May 27, 2021

Related U.S. Application Data

(63) Continuation of application No. PCT/CN2020/080924, filed on Mar. 24, 2020.

(30) Foreign Application Priority Data

Nov. 22, 2019 (CN) .......................... 201911154806.5

(51) Int. Cl.
*G06T 11/00* (2006.01)
*G06T 7/73* (2017.01)
(Continued)

(52) U.S. Cl.
CPC .............. *G06T 11/001* (2013.01); *G06T 5/50* (2013.01); *G06T 7/73* (2017.01); *G06V 10/40* (2022.01); *G06T 2207/20221* (2013.01)

(58) Field of Classification Search
CPC ........... G06T 11/001; G06T 7/73; G06T 5/50; G06K 9/46
See application file for complete search history.

(56) References Cited

U.S. PATENT DOCUMENTS 9,652,887 B2 5/2017 Chun et al.
9,940,753 B1 * 4/2018 Grundhofer ............ G06T 11/00
(Continued)

FOREIGN PATENT DOCUMENTS

CN 1551135 A 12/2004
CN 102184108 A 9/2011
(Continued)

OTHER PUBLICATIONS

Zhang, Q., Guo, Y., Laffont, P. Y., Martin, T. and Gross, M., 2017. A virtual try-on system for prescription eyeglasses. IEEE computer graphics and applications, 37(4), pp. 84-93.*

(Continued)

*Primary Examiner* — Sarah Lhymn
(74) *Attorney, Agent, or Firm* — Cooper Legal Group, LLC

(57) ABSTRACT

Provided are an image processing method and apparatus, an electronic device, and a storage medium. The method includes: identifying a first object to be rendered in a target image and a second object to which the first object belongs in the target image; generating a reference image including a mark based on the target image and the second object, the mark being used for recording a coverage area of the second object; determining an area to be rendered based on the reference image and the first object, the area to be rendered being located within the coverage area corresponding to the mark; and rendering the area by utilizing a target material to generate a rendering result. Through the process, the rendering range can be constrained when the first object is rendered based on the reference image including the mark generated by the second object to which the first object belongs, so that the reliability and authenticity of a rendering result are improved.

15 Claims, 12 Drawing Sheets

(51) Int. Cl.
*G06T 5/50* (2006.01)
*G06V 10/40* (2022.01)

(56) References Cited

U.S. PATENT DOCUMENTS

| | | | |
|---|---|---|---|
| 10,282,914 B1* | 5/2019 | Tran | G01G 19/44 |
| 10,528,796 B2* | 1/2020 | Shen | A45D 44/005 |
| 2005/0078124 A1 | 4/2005 | Liu | |
| 2005/0117173 A1* | 6/2005 | Kugo | G06K 9/0061 358/1.1 |
| 2015/0055864 A1* | 2/2015 | Hasegawa | H04N 1/46 382/167 |
| 2015/0206339 A1 | 7/2015 | Chun et al. | |
| 2016/0128450 A1 | 5/2016 | Saito et al. | |
| 2018/0005420 A1 | 1/2018 | Bondich et al. | |
| 2018/0075524 A1* | 3/2018 | Sartori Odizzio | G06Q 30/0643 |
| 2018/0164586 A1 | 6/2018 | Jin | |
| 2019/0014884 A1 | 1/2019 | Fu et al. | |
| 2019/0035149 A1* | 1/2019 | Chen | G06T 7/50 |
| 2019/0095697 A1* | 3/2019 | Shen | G06K 9/00248 |
| 2019/0130166 A1 | 5/2019 | Wang | |
| 2021/0217217 A1* | 7/2021 | Bondich | G06K 9/00315 |

FOREIGN PATENT DOCUMENTS

| | | | |
|---|---|---|---|
| CN | 102915308 A | | 2/2013 |
| CN | 104679509 A | | 6/2015 |
| CN | 105096354 A | * | 11/2015 |
| CN | 106447739 A | | 2/2017 |
| CN | 108564531 A | | 9/2018 |
| CN | 109242785 A | | 1/2019 |
| CN | 109302618 A | | 2/2019 |
| CN | 109583263 A | | 4/2019 |
| CN | 109785259 A | | 5/2019 |
| CN | 109977868 A | | 7/2019 |
| CN | 109981989 A | | 7/2019 |
| CN | 110062157 A | | 7/2019 |
| CN | 110084154 A | | 8/2019 |
| CN | 110211211 A | | 9/2019 |
| EP | 3477542 A1 | | 5/2019 |
| JP | 2007213623 A | | 8/2007 |
| JP | 2010250420 A | | 11/2010 |
| JP | 2012095730 A | | 5/2012 |
| JP | 2019070870 A | | 5/2019 |
| JP | 2019070871 A | | 5/2019 |
| JP | 2019070872 A | | 5/2019 |
| WO | 2006122212 A2 | | 11/2006 |

OTHER PUBLICATIONS

Jakab, Tomas, Ankush Gupta, Hakan Bilen, and Andrea Vedaldi. "Unsupervised learning of object landmarks through conditional image generation." Advances in neural information processing systems 31 (2018) (pp. 1-12).*
International Search Report in the international application No. PCT/CN2020/080924, dated Aug. 21, 2020, 3 pgs.
First Office Action of the Chinese application No. 201911154806.5, dated Jul. 5, 2021, 15 pgs.
"Simulating Makeup through Physics-Based Manipulation of Intrinsic Image Layers", Jun. 2015, Chen Li, Kun Zhou and Stephen Lin, IEEE Conference on Computer Vision and Pattern Recognition (CVPR), pp. 4621-4629.
"Example-Based Cosmetic Transfer", Oct. 2007, Wai-Shun Tong, Chi-Keung Tang, Michael S. Brown and Ying-Qing Xu, 15th Pacific Conference on Computer Graphics and Applications, pp. 211-218.
Supplementary European Search Report in the European application No. 20820759.7, dated Jul. 21, 2021, 10 pgs.
First Office Action of the Japanese application No. 2020-570186, dated Feb. 22, 2022, 8 pgs.
"Research on Virtual-Real Sense Synthesis Method Based on Computer Vision", Jun. 2008, Xiong Yi and Li Li-Jun, Computer Engineering and Design, vol. 29, No. 11, 3 pgs.
"Quantitative Analysis of Human-Model Agreement in Visual Saliency Modeling: A Comparative Study", Jan. 2013, Ali Borji, Dicky N. Sihite and Lautent Itti, IEEE Transactions on Image Processing, vol. 22, No. 1, pp. 55-69.

* cited by examiner

IMAGE PROCESSING METHOD AND APPARATUS, ELECTRONIC DEVICE, AND STORAGE MEDIUM

CROSS-REFERENCE TO RELATED APPLICATION

This application is a continuation of International Patent Application No. PCT/CN2020/080924, filed on Mar. 24, 2020, which claims priority to Chinese Patent Application No. 201911154806.5, filed to the National Intellectual Property Administration, PRC on Nov. 22, 2019 and entitled "Image Processing Method and Apparatus, Electronic Device and Storage Medium". The disclosures of International Patent Application No. PCT/CN2020/080924 and Chinese Patent Application No. 201911154806.5 are hereby incorporated by reference in their entireties.

TECHNICAL FIELD

The present disclosure relates to the technical field of image processing, and more particularly, to an image processing method and apparatus, an electronic device, and a storage medium.

BACKGROUND

Image rendering is a process of converting a three-dimensional light energy transfer process into a two-dimensional image. Scenes and entities are represented in three dimensions, closer to the real world and easier to be manipulated and transformed. However, in a process of rendering a target object, a rendering overflow phenomenon always occurs.

SUMMARY

According to a first aspect of the present disclosure, a method for image processing is provided, which may include the following operations.

A first object to be rendered in a target image and a second object to which the first object belongs in the target image are identified.

A reference image including a mark is generated based on the target image and the second object, the mark being used for recording a coverage area of the second object.

An area to be rendered is determined based on the reference image and the first object, the area to be rendered being located within the coverage area corresponding to the mark.

The area to be rendered is rendered by utilizing a target material to generate a rendering result.

According to an aspect of the present disclosure, an apparatus for image processing is provided, which may include an identification module, a reference image generation module, a to-be-rendered area determination module and a rendering module.

The identification module is configured to identify a first object to be rendered in a target image and a second object to which the first object belongs in the target image.

The reference image generation module is configured to generate a reference image including a mark based on the target image and the second object, the mark being used for recording a coverage area of the second object.

The to-be-rendered area determination module is configured to determine an area to be rendered based on the reference image and the first object, the area to be rendered being located within the coverage area corresponding to the mark.

The rendering module is configured to render the area by utilizing a target material to generate a rendering result.

According to an aspect of the present disclosure, an electronic device is provided. The electronic device may include:

a processor; and a memory configured to store instructions executable by the processor.

The processor may be configured to implement the above image processing method.

According to an aspect of the present disclosure, a computer-readable storage medium is provided, which may store computer program instructions thereon. The computer program instructions are executed by a processor to implement the above method for image processing.

According to an aspect of the present disclosure, computer-readable codes are provided. When the computer-readable codes run in an electronic device, a processor in the electronic device may execute the method for image processing.

It is to be understood that the above general descriptions and detailed descriptions below are only exemplary and explanatory and not intended non limit the present disclosure. According to the following detailed descriptions on the exemplary embodiments with reference to the accompanying drawings, other characteristics and aspects of the present disclosure become apparent.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Various exemplary embodiments, features and aspects of the present disclosure will be described below in detail with reference to the accompanying drawings. A same numeral in the accompanying drawings indicates a same or similar component. Although various aspects of the embodiments are illustrated in the accompanying drawings, the accompanying drawings are unnecessarily drawn in proportion unless otherwise specified.

As used herein, the word "exemplary" means "serving as an example, embodiment, or illustration". Thus, any embodiment described herein as "exemplary" is not to be construed as preferred or advantageous over other embodiments.

The term "and/or" in this specification is only for describing an association relationship between associated objects, which represents three relationships may exist. For example, A and/or B may represent the following three cases: only A exists, both A and B exist, and only B exists. In addition, the term "at least one type" herein represents any one of multiple types or any combination of at least two types in the multiple types, for example, at least one type of A, B and C may represent any one or multiple elements selected from a set formed by the A, the B and the C.

In addition, for describing the disclosure better, many specific details are presented in the following specific implementations. It is to be understood by those skilled in the art that the present disclosure still can be implemented even without some specific details. In some examples, methods, means, components and circuits known very well to those skilled in the art are not described in detail, to highlight the subject of the present disclosure.

Figure 1:
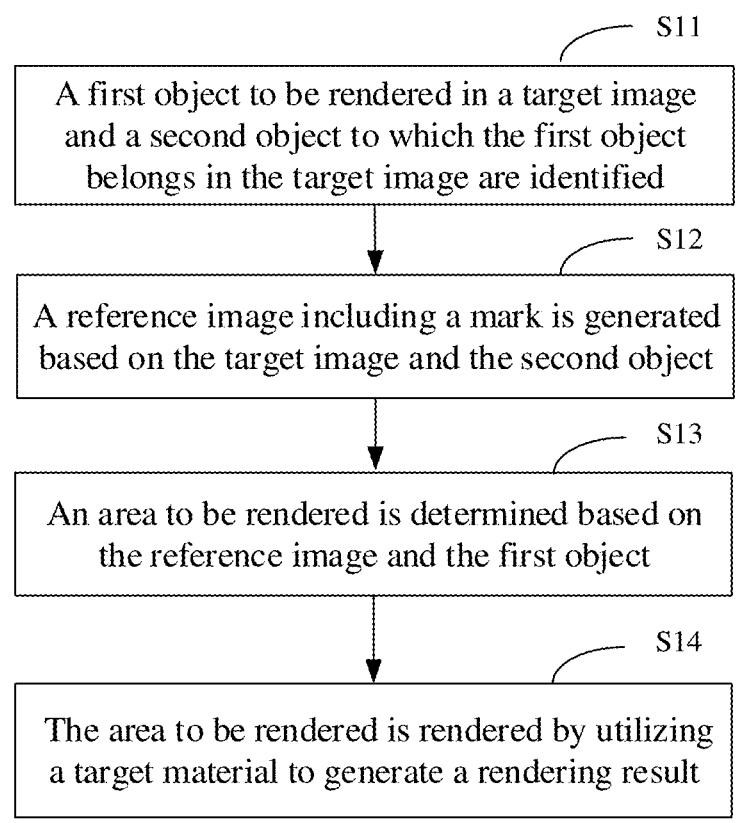
FIG. 1 illustrates a flowchart of an image processing method according to an embodiment of the present disclosure.

FIG. 1 illustrates a flowchart of an image processing method according to an embodiment of the present disclosure. The method may be applied to an image processing apparatus which may be a terminal device, a server or other processing device, etc. The terminal device may be User Equipment (UE), a mobile device, a user terminal, a terminal, a cell phone, a cordless phone, a Personal Digital Assistant (PDA), a handheld device, a computing device, a vehicle-mounted device, a wearable device, etc.

In some possible implementations, the image processing method may be implemented by enabling a processor to call computer-readable instructions stored in a memory.

As shown in FIG. 1, the image processing method may include the following operations.

In S11, a first object to be rendered in a target image and a second object to which the first object belongs in the target image are identified.

In S12, a reference image including a mark is generated based on the target image and the second object, the mark being used for recording a coverage area of the second object.

In S13, an area to be rendered is determined based on the reference image and the first object, the area to be rendered being located within the coverage area corresponding to the mark.

In S14, the area to be rendered is rendered by utilizing a target material to generate a rendering result.

According to the image processing method provided by the embodiments of the present disclosure, the first object to be rendered and the second object to which the first object belongs in the target image may be identified, the reference image including the mark may be generated based on the target image and the second object, and the area to be rendered which is located in the coverage area corresponding to the mark may be determined based on the reference image and the first object, so that the area to be rendered may be rendered by utilizing a target material, and the rendering result may be generated. Through the process, the rendering range can be constrained when the first object is rendered based on the reference image including the mark generated by the second object to which the first object belongs, so that the reliability and authenticity of a rendering result are improved.

In the embodiment above, the target image is not limited to any types. Any image requiring rendering can be taken as the target image. In a possible implementation, the target image may be an object with a face area, such as a portrait image, a half-body image, or a whole-body image.

Figure 2:
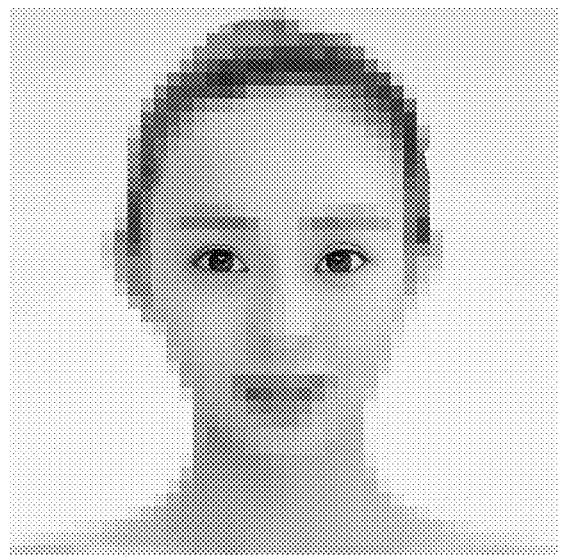
FIG. 2 illustrates a schematic diagram of a target image according to an embodiment of the present disclosure.

FIG. 2 illustrates a schematic diagram of a target image according to an embodiment of the present disclosure. As shown in the figure, the target image may be a portrait image containing a face in the embodiments of the present disclosure. In addition, the specific content of the first object to be rendered in the target image may also be confirmed based on actual rendering requirements, and no limitation is made in the embodiments of the present disclosure.

In a possible implementation, when the target image is an object including a face area, the first object may be a portion of the face, such as a pupil, a nose bridge, an ear lobe, or a lip, which may be determined based on actual requirements. The specific content of the second object to which the first object belongs may be flexibly determined based on the actual situation of the first object. For example, when the first object is a pupil, the second object may be an eye; when the first object is a nose bridge, the second object may be a nose; when the first object is an ear lobe, the second object may be an ear; and when the first object is a lip, the second object may be a mouth. In addition, the number of target images is not limited. In a possible implementation, a target image may include a single picture or multiple pictures, i.e., objects in multiple pictures can be rendered in bulk at a time.

Since the target image, the first object and the second object can all be flexibly determined based on the actual situation, the reference image generated based on the target image and the second object, the marks included in the reference image and the area to be rendered determined based on the reference image and the first object can all be flexibly changed based on different situations of the target image and the like. Explanation is not provided here for a while, and the details will be described in the following embodiments.

As can be seen from S14 of the above-mentioned embodiment, the rendering result can be obtained by rendering the area to be rendered based on the target material, and the target material can also be flexibly set based on the actual situation of the first object, and is not limited to the following embodiments. For example, when the first object is a pupil, the target material may be a pupil beautifying material; when the first object is a nose bridge, the target material may be a shadow material; when the first object is an ear lobe, the target material may be an ear ring material; and when the first object is a lip, the target material may be a lipstick material.

Figure 3:
FIG. 3 illustrates a schematic diagram of a target material according to an embodiment of the present disclosure.

In a possible implementation, the first object may include a pupil object, the second object may include an eye object, the target material may include a material for beautifying the pupil. In an example, the material for beautifying the pupil may be a pupil beautifying material. The specific content of the pupil material may be flexibly selected and set, and the acquisition mode may be flexibly determined based on actual conditions. In an example, the pupil beautifying material may be randomly selected from a pupil beautifying material library. In an example, the pupil beautifying material may be a specific material selected based on requirements, etc. FIG. 3 illustrates a schematic diagram of a target material according to an embodiment of the present disclosure. As can be seen from the figure, in the example, the target material may be a purple pupil beautifying material having a glossy texture (purple color is not visible due to the constraints on drawing of figures).

Based on the first object including a pupil object, the second object including an eye object and the pupil beautifying material including the pupil beautifying material, the image processing method provided by the embodiments of the present disclosure can be applied to a process of beautifying the pupil in a face image, so that the rendering range is effectively restricted by a reference image with a mark generated based on the eye object, and the possibility of rendering the pupil beautifying material to an area outside the pupil in the rendering process is reduced.

It should be noted that the image processing method of the embodiments of the present disclosure is not limited to processing of an image including a face area, and may be applied to any image processing. The present disclosure is not limited thereto.

The manner in which the target image is acquired is not limited, and is not limited by the embodiments below. In a possible implementation, the target image may be obtained by reading or receiving. In a possible implementation, the target image may be obtained by active capture or other active acquisition.

Based on the target image obtained by the above embodiment, the first object and the second object in the target image may be identified by S11. The manner for implementing S11 is not limited. In a possible implementation, the first object and the second object to be rendered in the target image may be determined by performing detection in the target image. In an example, detection for the first object and detection for the second object may be performed in the target image, respectively. In an example, detection for the second object may also be carried out in the target image, and then the target image may be clipped based on a detection result with regard to the second object to retain an image of the second object. Since the first object belongs to a part of the second object, detection may be further carried out in the clipped image to obtain an area corresponding to the first object.

The manner of detection is also not limited in the embodiments of the present disclosure. Any manner in which the target object may be failed or detected from an image can be used as an implementation of detection. In a possible implementation, detection may be achieved by feature extraction.

Therefore, in a possible implementation, S11 may include the following operations.

In S111, Features are extracted from the target image to respectively obtain a first feature point set corresponding to the first object and a second feature point set corresponding to the second object.

In S112, first feature points included in the first feature point set are connected in a first preset manner to obtain an area corresponding to the first object.

In S113, second feature points included in the second feature point set are connected in a second preset manner to obtain an area corresponding to the second object.

The first feature point set and the second feature point set may be obtained by extracting features from the target image, feature points in the first feature point set may be connected in the first preset manner to obtain the area corresponding to the first object, and feature points in the second feature point set may be connected in the second preset manner to obtain the area corresponding to a second object. The area corresponding to the first object may also be called a coverage area of the first object. The area corresponding to the second object may also be called a coverage area of the second object.

Through the process, the positions of the first object and the second object in the target image can be quickly located on the basis of the first feature point set and the second feature point set in an effective feature extraction mode, so that the area corresponding to the first object and the area corresponding to the second object to which the first object belongs may be obtained, the rendering process of the first object can be conveniently restrained by the position of the second object, and the reliability of the rendering result is improved.

In the above embodiment, the implementation manner of S111 is not limited. That is, the specific manner of feature extraction is not limited in the embodiment, and any calculation method capable of performing feature extraction may be used as the implementation manner of S111.

Figure 4:
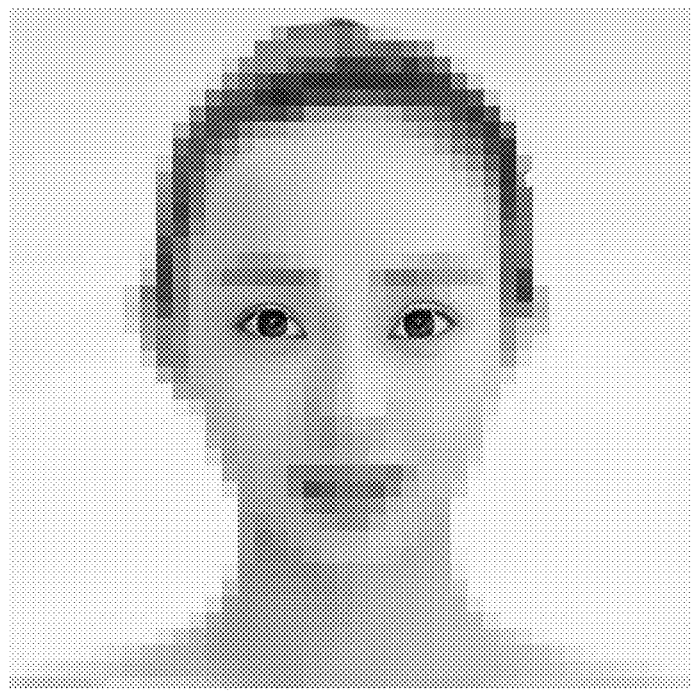
FIG. 4 illustrates a schematic diagram of a first feature point set according to an embodiment of the present disclosure.
Figure 5:
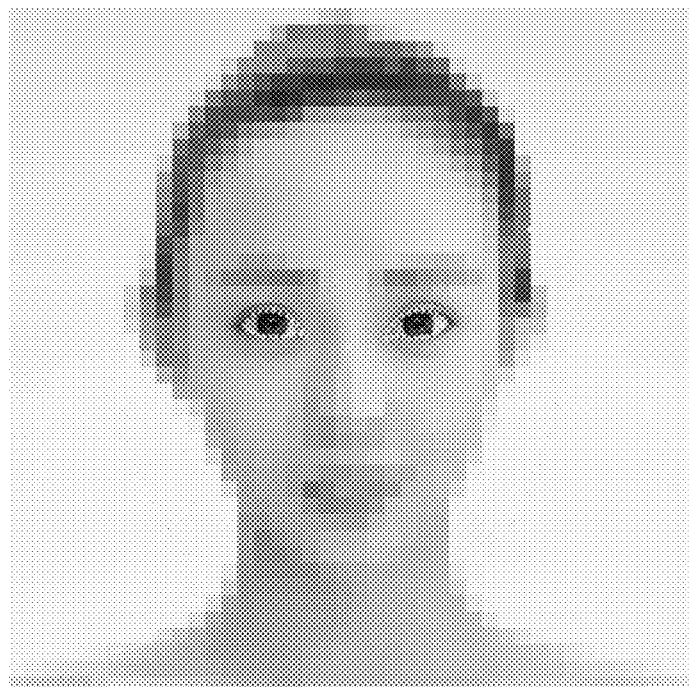
FIG. 5 illustrates a schematic diagram of a second feature point set according to an embodiment of the present disclosure.

As mentioned in the above embodiment, a sequence according to which the detection is performed on the first object and the second object may be flexibly selected based on the actual situation. Since feature extraction is a possible implementation manner of detection, the feature extraction may be performed on the first object and the second object at the same time, or the feature extraction may be performed on the second object first and then on the first object. The feature extraction manners for the first object and the second object may be the same or different, and will not be repeated herein. Based on the above reasons, there may be or may not be a common feature point between the first feature point set and the second feature point set. No matter whether there is a common feature point or not, there is no impact on the subsequent process of obtaining the area corresponding to the first object and the area corresponding to the second object. Therefore, a relationship between the two feature point sets is not limited in the embodiments of the present disclosure. FIG. 4 illustrates a schematic diagram of a first feature point set according to an embodiment of the present disclosure. FIG. 5 illustrates a schematic diagram of a second feature point set according to an embodiment of the present disclosure. As shown in the figures, in an example, the first feature point set in FIG. 4 is a set of feature points resulting from pupil feature point extraction of a face image in FIG. 2. The second feature point set in FIG. 5 is a set of feature points obtained from extracting eye feature points from the face image in FIG. 2. As can be seen from the figures, the first feature point set and the second feature point set in the examples of the present disclosure are both obtained by extracting features from the target image, and the first feature point set and the second feature point set have coincident feature points at the junction of the pupil and the eye.

After obtaining the first feature point set and the second feature point set, the area corresponding to the first object and the area corresponding to the second object may be obtained through S112 and S113. In the embodiments of the present disclosure, the execution sequence of S112 and S113 is not restricted. S112 and S113 may be executed simultaneously or sequentially. When executed sequentially, S112 or S113 may be executed first, which is not limited herein.

As can be seen from S112, the process of obtaining the first object may be connecting feature points in the first feature point set in a first preset mode. A specific implementation of the first preset mode is not limited in the embodiments of the present disclosure, which may be determined based on the actual situation of the first object without limitation. Similarly, a second preset mode of obtaining the area corresponding to the second object may be flexibly selected based on actual conditions, and the second preset mode may be the same as or different from the first preset mode.

In a possible implementation, S112 may include the following operation.

First feature points included in the first feature point set are connected to obtain at least one first mesh according to the sequence in a first preset mode, and an area covered by the first mesh is taken as the area corresponding to the first object.

It can be seen from the above embodiments that when the area corresponding to the first object is obtained, the first feature points contained in the first feature point set may be connected in the first preset mode. It has been proposed in the above embodiments that the first preset mode may be set based on actual conditions, and therefore the connection order of the first feature points is also determined in a preset mode. After the first feature points are connected in a preset order, at least one mesh may be obtained, and the mesh may be referred to as a first mesh in the embodiments of the present disclosure. The amount and shape of the first meshes may be determined based on the number of the first feature points contained in the first feature point set and the situation of the first preset mode. In an example, the first preset mode may be: classifying each three first feature points in the first feature point set into a group for connection to form multiple triangular meshes. Particularly, there is no limits to which three points are classified into a group, which may be set based on actual conditions. In an example, the first preset mode may also be: classifying each four first feature points in the first feature point set into a group for connection to form multiple quadrangular meshes. Similarly, no limit is set to the classification mode.

Based on the example of the above preset mode, it can be seen that in a possible implementation, S112 may include the following operations.

In S1121, the first feature point set is divided by taking at least three first feature points as a group to obtain at least one subset of first feature points.

In S1122, the first feature points included in the at least one subset of first feature points are sequentially connected to obtain at least one first mesh.

In S1123, an area covered by the at least one first mesh is taken as the area corresponding to the first object.

The number of first feature points as a group may be three, or may be more than three such as four, five or six, without limitation herein. Through the process, the area where the first object is located can be completely covered effectively based on the actual situation of the first feature point set, excessive computing resources are not needed, the first object can be quickly and efficiently determined, and preparation can be made for a subsequent rendering process.

Similarly, in a possible implementation, S113 may include the following operations.

Second feature points included in the second feature point set are connected into at least one second mesh according to the sequence of a second preset mode, and an area covered by the second mesh is taken as the area corresponding to the second object.

The specific implementation process of the above embodiment may refer to the implementation process of the first object. In a possible implementation, S113 may include the following operations.

In S1131, the second feature point set is divided by taking at least three second feature points as a group to obtain at least one subset of second feature points.

In S1132, the second feature points included in the at least one subset of second feature points are sequentially connected to obtain at least one second mesh.

In S1133, an area covered by the at least one second mesh is taken as the area corresponding to the second object.

Figure 6:
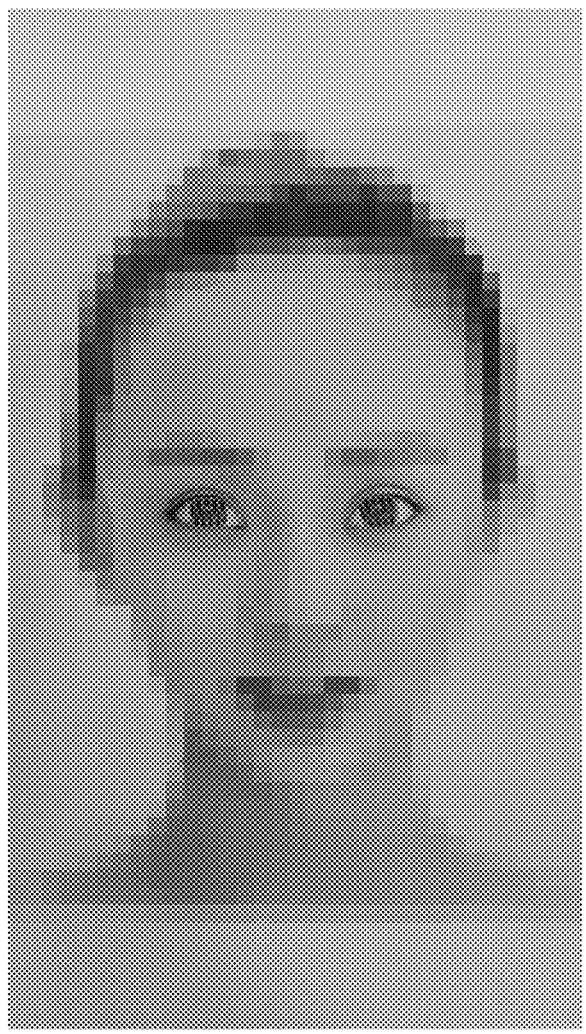
FIG. 6 illustrates a schematic diagram of a second object according to an embodiment of the present disclosure.

FIG. 6 illustrates a schematic diagram of a second object according to an embodiment of the present disclosure. As can be seen from the figure, in an example, by connecting the second feature points in the second feature point set in FIG. 5 in the second preset mode, multiple triangular meshes may be obtained, which together form the area corresponding to the second object.

The above first and second meshes, as polygon meshes, are sets of vertices and polygons representing polyhedral shapes in three-dimensional computer graphics, also called unstructured meshes. Exemplarily, the first mesh and the second mesh may be triangular meshes. The area corresponding to the first object and the area corresponding to the second object are enclosed by the triangular mesh so as to facilitate subsequent rendering.

After determining the first object and the second object, a reference image including a mark for recording a coverage area of the second object may be generated from the target image and the second object through S12. The implementation manner of S12 may be flexibly determined based on the actual conditions of the first object and the second object, and is not limited to the embodiments described below. In a possible implementation, S12 may include the following operations.

In S121, a first initial image with a same size as the target image is generated.

In S122, the coverage area of the second object is marked in the first initial image to obtain the reference image.

By generating the first initial image with the same size as the target image and marking the coverage area of the second object in the first initial image to obtain the reference image, the position of the second object in the target image can be effectively marked by utilizing a reconstructed image with the same size as the target image, so that whether the rendered pixels exceed the position constraint of the second object or not when the first object is rendered can be determined on the basis of the marks in a subsequent rendering process, the possibility of rendering overflow is reduced, and the reliability and authenticity of rendering are improved.

In the above embodiment, the size of the first initial image is the same as that of the target image, and the specific image content thereof is not limited in the embodiments of the present disclosure. In an example, the first initial image may be a blank image. In an example, the first initial image may be an image covered with a certain texture. The covered texture is not limited in the embodiments of the present disclosure and can be flexibly set based on practical situations. The texture is one or multiple two-dimensional graphics representing details of the surface of an object, and may also be referred to as texture mapping. In an example, the first initial image may be an image covered by a solid color texture, the color of which may be flexibly set to black, white, red, etc. The generation process of the first initial image is not limited in the embodiments of the present disclosure. An image of the same size may be created after the size of the target image is obtained.

After the first initial image is generated, the coverage area of the second object may be marked in the first initial image to obtain the reference image through S122. Since the first initial image has the same size as the target image, the position of the marked area in the first initial image coincides with the position of the second object in the target image. The manner of marking is not limited in the embodiments of the present disclosure. Any marking manner that can distinguish the area corresponding to the second object from the remaining areas of the first initial object in the first initial image may be implemented as a marking manner In a possible implementation, the marking may be adding markers to the first initial image at locations where marking is desired. The markers may be symbols, data, textures, etc., without limitation herein.

In a possible implementation, the marking may be implemented by adjusting pixel values in an image. In this implementation, S122 may include the following operation.

At least one pixel included in the coverage area of the second object is changed into a target pixel value in the first initial image to obtain the reference image.

An image area having a target pixel value is an image area including a mark in the reference image. Further, in addition to marking the target pixel values for the coverage area of the second object for the first initial image, other areas than the coverage area of the second object may be adjusted to other pixel values that are different from the target pixel values to achieve significant differentiation of the two different areas.

By changing at least one pixel included in the coverage area of the second object into the target pixel value in the first initial image to obtain the reference image, marking of the coverage area of the second object can be realized in a simple manner of changing a color of the coverage area of the second object. The process is simple, and the cost is saved.

In a possible implementation, S122 may also include the following operation.

The coverage area of the second object is rendered through a preset texture in the first initial image to obtain the reference image.

Figure 7:
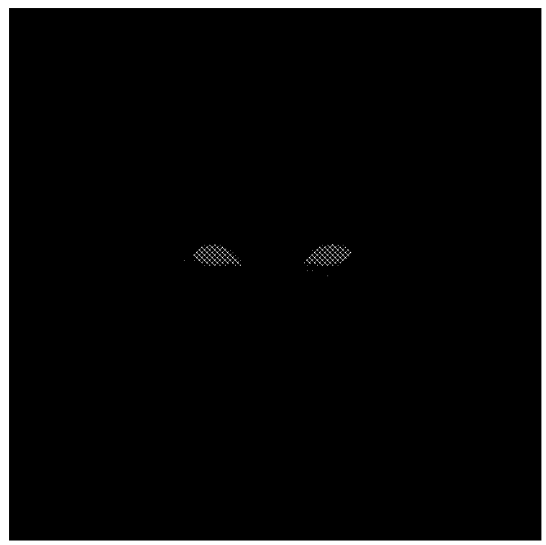
FIG. 7 illustrates a schematic diagram of a reference image according to an embodiment of the present disclosure.

In the above embodiment, a preset texture is rendered to the area corresponding to the second object, the specific implementation thereof is not limited in the embodiments of the present disclosure. The area corresponding to the second object may be distinguished from other areas of the first initial image. In an example, when the first initial image is a blank image, the preset texture may be any texture that does not include a blank area. In an example, when the first initial image is overlaid by a solid color texture of a certain color, the preset texture may be any texture that does not contain the color. FIG. 7 illustrates a schematic diagram of a reference image according to an embodiment of the present disclosure. As can be seen from the figure, in the example of the present disclosure, the first initial image is an image covered by a black texture, while the second object is rendered by a red texture, thereby generating the reference image as shown in the figure.

The reference image is obtained by rendering the coverage area of the second object through a preset texture in the first initial image. The position of the second object can be marked in the reference image in a simpler manner, and sufficient preparation is made for subsequent rendering of the area to be rendered based on the mark. Meanwhile, the second object is applied to the whole rendering process through the rendering mark. The whole image processing process can be completed through the same rendering means, extra resource consumption is reduced, the overall image processing efficiency is improved, and the cost is saved.

After obtaining the reference image, the area to be rendered may be determined through S13. In a possible implementation, S13 may include the following operations.

In S131, a second initial image with a same size as the target image is generated.

In S132, the area to be rendered is determined in the second initial image based on the reference image and the first object.

In the embodiment, the area to be rendered in the second initial image with the same size as the target image is determined based on the reference image and the first object. Through the above process, since the reference image is generated based on the position of the second object in the target image, the area to be rendered can be constrained by the position of the second object, thereby reducing the possibility that rendering overflows the required rendering range. The reliability of the rendering result is improved.

In particular, how to determine the area to be rendered based on the reference image and the first object can be flexibly determined based on actual conditions of the mark in the reference image. In a possible implementation, S132 may include the following operations.

In S1321, an area corresponding to the first object is taken as an initial area to be rendered in the second initial image.

In S1322, pixels of the initial area to be rendered are traversed, and when corresponding positions of the pixels in the reference image include the mark, the pixels are taken as pixels to be rendered.

In S1323, an area formed by the pixels to be rendered is taken as the area to be rendered.

In S1321, the generation process and implementation manner of the second initial image are not limited here. Reference may be made to the generation process and implementation manner of the first initial image proposed in the above embodiment, which will not be described in detail herein. It is noted that the implementation manner of the second initial image may be the same as or different from that of the first initial image.

After the second initial image is generated, the pixels of the initial area to be rendered may be traversed through S1322. When each pixel is traversed, the reference image may be searched for a pixel with the same position as the pixel traversed. The pixel traversed may be recorded as a traversed pixel in the embodiments of the present disclosure, and the corresponding pixel in the reference image may be recorded as a reference pixel. Then, whether the reference pixel is marked or not may be judged. It can be known from the above embodiment that the marked area in the reference image is the position of the second object in the target image. Therefore, if the reference pixel is marked, it indicates the traversal pixel in the area to be rendered is in the range of the second object, and in this case, the traversed pixel may be taken as a pixel to be rendered subsequently by the target material. If the reference pixel is not marked, it indicates that the traversed pixel in the area to be rendered exceeds the range of the second object, and in this case, if the traversed pixel is rendered, the rendering may exceed a preset range. Therefore the reference pixel cannot serve as a pixel to be rendered.

After pixels in an initial area to be rendered are traversed, all the pixels to be rendered may be obtained, and the pixels to be rendered may jointly form the area to be rendered.

Figure 8:
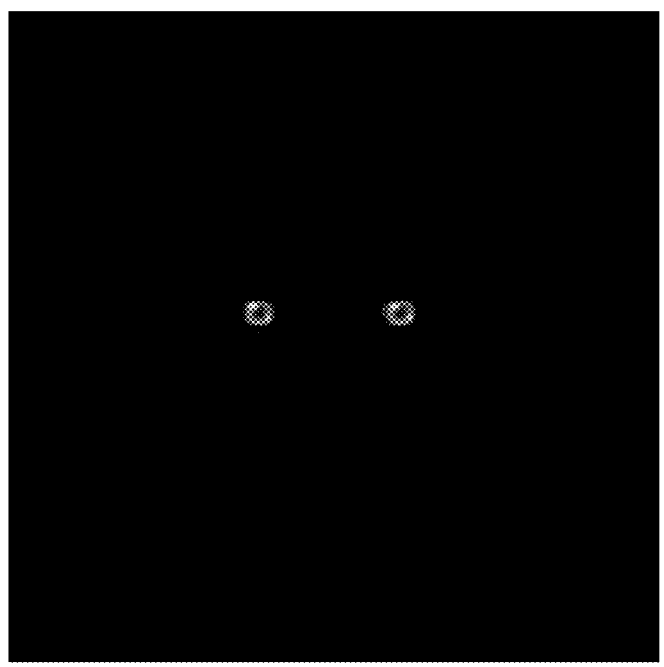
FIG. 8 illustrates a schematic diagram of a rendering result according to an embodiment of the present disclosure.

After the area to be obtained, the area to be rendered may be rendered using a target material through S14, so that a rendering result is obtained. The specific manner of rendering is not limited in the embodiments of the present disclosure, and any applicable rendering method may be implemented in the embodiments of the present disclosure. In an example, rendering may be implemented in a shader through OpenGL. The specific implementation of rendering through a preset texture in the first initial image proposed in the above embodiment may also be implemented in the same manner FIG. 8 illustrates a schematic diagram of a rendering result according to an embodiment of the present disclosure. As can be seen from the figure, the second initial image is an image covered by a black texture, and is rendered by the pupil beautifying material as shown in FIG. 3, thereby obtaining a rendering result as shown in the figure.

The area corresponding to the first object is taken as the initial area to be rendered in the second initial image, and pixels in the initial area to be rendered are traversed. When a pixel corresponding to a traversed pixel in the reference image is marked, the traversed pixel is taken as a pixels to be rendered, and the area formed by such pixels to be rendered is taken as the area to be rendered. The area to be rendered by the target material can be effectively cut, the possibility that the area exceeds the constraint range of the second object to which the first object belongs is reduced, and the reliability and authenticity of the rendering result are improved.

After the rendering result is obtained, the rendering result may be combined with the original target image, so that the target image can be further modified or perfected. The specific combination manner may be determined based on the actual situation and requirements of the target image and the target material. For example, when the target image is an image including a face area and the target material is a pupil beautifying material, the combination may be a combination of the rendering result and the target image, etc. Therefore, in a possible implementation, the method provided in the embodiments of the present disclosure may further include the following operations.

In S15, transparency of the target image is changed to obtain a change result.

In S16, the rendering result is fused with the change result to obtain a fused image.

Figure 9:
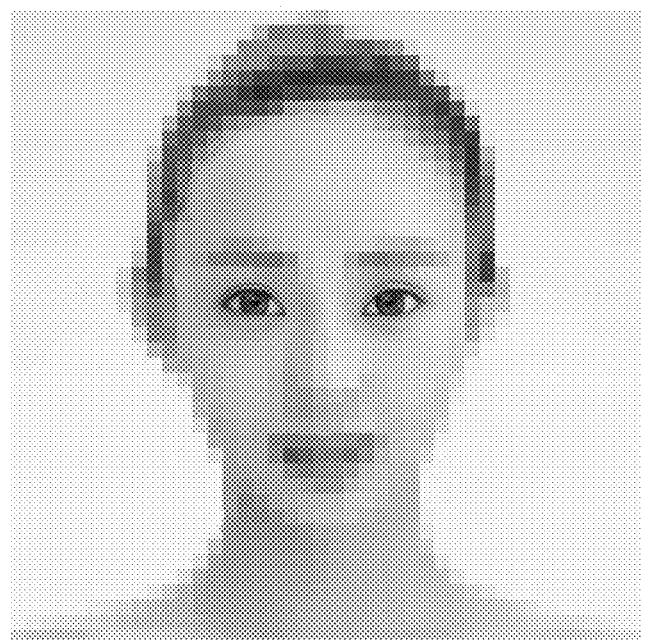
FIG. 9 illustrates a schematic diagram of a fusion result according to an embodiment of the present disclosure.

In the above embodiment, the specific value for changing the transparency of the target image is not limited here, which may be flexibly set based on the actual situation. The fusion effect of the rendering result and the target image can be guaranteed. Because the size of the second initial image generating the rendering result is the same as that of the target image, the rendering result can be effectively fused to a corresponding position in the target image. For example, when the target image is a face image and the target material is a pupil, the position to which the pupil material is rendered in the fusion result is consistent with the position of the pupil in the face image. Therefore, when the rendering result and the target image with the changed transparency are fused, the rendered pupil beautifying material is naturally fused to the position of the pupil in the face image, so that the pupil beautifying effect of the face image is achieved. FIG. 9 illustrates a schematic diagram of a fusion result according to an embodiment of the present disclosure. As can be seen from the figure that the pupil beautifying material of FIG. 3 may be efficiently and accurately fused to the pupil position of the face image of FIG. 2 by the image processing method proposed in each of the above embodiments.

Application Scenario Example

Make-up of a face image is one of the main methods in face image processing, such as pupil-beautifying, adding lipstick to the lip of the face image or adding shadow to the nose bridge. Taking pupil beautifying as an example, when a pupil beautifying material is rendered on the face image, the pupil beautifying material is most likely to be rendered on the eyelid or outside the eyelid in the pupil beautifying process because the opening and closing degree of eyes in the face image may be different, so that a pupil beautifying result is inaccurate, and realness of the pupil beautifying result is degraded.

Therefore, an image processing process based on a reliable rendering mode can greatly improve the quality of pupil beautifying, so that the quality and the application range of the image processing method can be improved and expanded.

As shown in FIGS. 2-9, the embodiments of the disclosure provide an image processing method. The specific process of the processing method may be as follows:

FIG. 2 is a face image to be pupil-beautified (i.e. the target image mentioned in the various embodiments of the disclosure). In an example of the present disclosure, a pupil contour point (shown in FIG. 4) of the face image may be extracted as a second feature point set of a second object and an eye contour point (shown in FIG. 5) may be extracted as a first feature point set of a first object through feature point extraction. After eye contour points are obtained, the eye contour points may be connected to obtain an eye triangular mesh as a first mesh according to a preset sequence (as shown in FIG. 6), and similarly, the pupil contour points may be connected to obtain another pupil triangular mesh as a second mesh according to a preset sequence.

After the eye triangular mesh shown in FIG. 6 is obtained, a black texture map with the same size as that of FIG. 2 may be created as a first initial image, then the black texture map and the vertex coordinates of the eye triangular mesh in FIG. 6 may be transmitted into a shader, pixels at positions corresponding to the eye triangular mesh in the black texture map may be rendered into red through OpenGL to serve as marks, and pixels at other positions may still keep an original state, so that the mask texture of the eye contour is thus obtained, i.e. the reference image including markers (as shown in FIG. 7).

After the mask texture of the eye contour is obtained, the mask texture of the eye contour, the vertex coordinates of the pupil triangular mesh obtained before, and the pupil beautifying material shown in FIG. 3 may be transmitted into a shader together, so that the pupil beautifying material may be rendered. In the application example of the present disclosure, the rendering process of the pupil beautifying material may be: firstly, generating a black texture image as a second initial image, determining a position of the pupil based on the vertex coordinates of the pupil triangular mesh, sequentially traversing each pixel at the pupil position, and every time a pixel is traversed, judging whether a color of a pixel corresponding to the pixel in the mask texture of the eye outline is red or not: if yes, indicating that the pixel is in the range of the eye and is a pixel to be rendered, and then rendering the pupil beautifying material on the pixel; otherwise, if not, indicating that the pixel is out of the range of eyes, and not rendering the pupil beautifying material on the pixel. After each pixel at the pupil position is traversed, a rendering result can be obtained. The rendering result may be regarded as a clipped pupil beautifying material, and the position of the pupil beautifying material is consistent with the position of the pupil in the face image. The rendering result is shown in FIG. 8.

After the rendering result is obtained, the rendering result and the original face image may be subjected to transparency fusion. Since the position of the rendering result is consistent with the position of the pupil in the face image, the pupil may be accurately fused into the pupil of the face image after fusion, so that the pupil of the face can be beautified. The fused result is shown in FIG. 9. It can be seen from the figure that a reliable pupil beautifying result can be obtained through the above process, and the fused pupil beautifying does not exceed the range of the pupil, and is not rendered to the periocular position.

According to the image processing method provided by the embodiments of the present disclosure, a first object to be rendered and a second object to which the first object belongs in a target image may be identified, a reference image including a mark is generated based on the target image and the second object, and an area to be rendered which is located in a coverage area corresponding to the mark may be determined based on the reference image and the first object, so that the area to be rendered can be rendered by utilizing a target material, and a rendering result can be generated. Through the process, the rendering range can be constrained when the first object is rendered based on the reference image including the mark generated by the second object to which the first object belongs, so that the reliability and authenticity of a rendering result are improved.

It should be noted that the image processing method of the embodiments of the present disclosure is not limited to the above image processing including the face area, nor is it limited to the above process of pupil beautifying of the face image. The method may be applied to arbitrary image processing, which is not limited by the present disclosure.

It is to be understood that the method embodiments mentioned in the present disclosure may be combined with each other to form a combined embodiment without departing from the principle and logic, which is not elaborated in the embodiments of the present disclosure for the sake of simplicity.

It may be understood by the person skilled in the art that in the method of the specific implementations, the sequence of each operation does not mean a strict execution sequence or form any limit to the implementation process. The specific execution sequence of each operation may be determined in terms of the function and possible internal logic.

Figure 10:
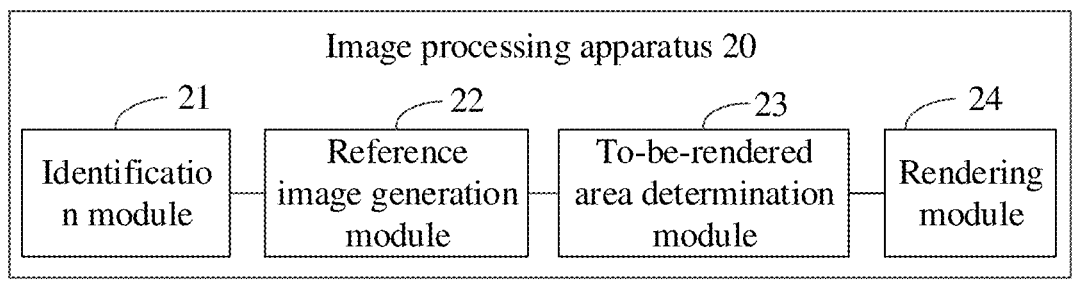
FIG. 10 illustrates a block diagram of an image processing apparatus according to an embodiment of the present disclosure.

FIG. 10 illustrates a block diagram of an image processing apparatus according to an embodiment of the present disclosure. The image processing apparatus may be a terminal device, a server or other processing device, etc. The terminal device may be a UE, a mobile device, a user terminal, a terminal, a cell phone, a cordless phone, a PDA, a handheld device, a computing device, a vehicle-mounted device, a wearable device, etc.

In some possible implementations, the image processing apparatus may be implemented by enabling a processor to call computer-readable instructions stored in a memory.

As shown in FIG. 10, the image processing apparatus 20 may include an identification module 21, a reference image generation module 22, a to-be-rendered area determination module 23, and a rendering module 24.

The identification module 21 is configured to identify a first object to be rendered in a target image and a second object to which the first object belongs in the target image.

The reference image generation module 22 is configured to generate a reference image including a mark based on the target image and the second object, the mark being used for recording a coverage area of the second object.

The to-be-rendered area determination module 23 is configured to determine an area to be rendered based on the reference image and the first object, the area to be rendered being located within the coverage area corresponding to the mark.

The rendering module 24 is configured to render the area by utilizing a target material to generate a rendering result.

In a possible implementation, the reference image generation module is configured to: generate a first initial image with a same size as the target image; and mark the coverage area of the second object in the first initial image to obtain the reference image.

In a possible implementation, the reference image generation module is further configured to: change at least one pixel included in the coverage area of the second object into a target pixel value in the first initial image to obtain the reference image.

In a possible implementation, the to-be-rendered area determination module is configured to: generate a second initial image with a same size as the target image; and determine the area to be rendered in the second initial image based on the reference image and the first object.

In a possible implementation, the to-be-rendered area determination module is further configured to: take an area corresponding to the first object as an initial area to be rendered in the second initial image; traverse pixels of the initial area to be rendered, and when positions in the reference image, corresponding to traversed pixels, include the mark, take the traversed pixels as pixels to be rendered; and take an area formed by the pixels to be rendered as the area to be rendered.

In a possible implementation, the identification module is configured to: extract features from the target image to respectively obtain a first feature point set corresponding to the first object and a second feature point set corresponding to the second object; connect first feature points included in the first feature point set in a first preset manner to obtain an area corresponding to the first object; and connect second feature points included in the second feature point set in a second preset manner to obtain an area corresponding to the second object.

In a possible implementation, the identification module is further configured to: divide the first feature point set by taking at least three first feature points as a group to obtain at least one subset of first feature points; sequentially connect the first feature points included in the at least one subset of first feature points to obtain at least one first mesh; and take an area covered by the at least one first mesh as the area corresponding to the first object.

In a possible implementation, the identification module is further configured to: divide the second feature point set by taking at least three second feature points as a group to obtain at least one subset of second feature points; sequentially connect the second feature points included in the at least one subset of second feature points to obtain at least one second mesh; and take an area covered by the at least one second mesh as the area corresponding to the second object.

In a possible implementation, the apparatus may further include a fusion module, configured to: change transparency of the target image to obtain a change result; and fuse the rendering result with the change result to obtain a fused image.

In a possible implementation, the first object may include a pupil, the second object may include an eye, and the target material may include a material for beautifying the pupil.

An embodiment of the present disclosure further provides a computer-readable storage medium, which stores computer program instructions thereon. The computer program instructions are executed by a processor to implement the above method. The computer-readable storage medium may be a non-volatile computer-readable storage medium.

An embodiment of the present disclosure further provides an electronic device, which includes: a processor; and a memory configured to store instructions executable by the processor, the processor being configured to execute the above method.

The electronic device may be provided as a terminal, a server or other types of devices.

Figure 11:
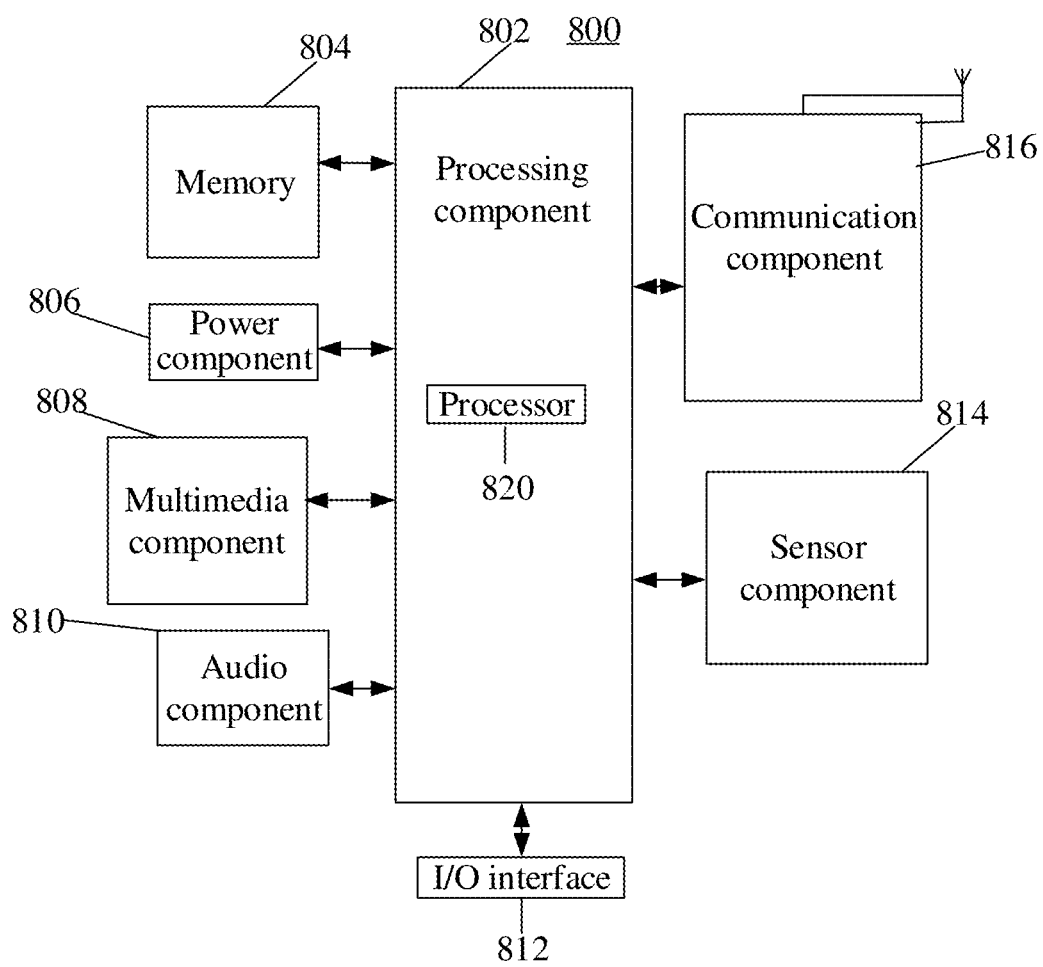
FIG. 11 illustrates a block diagram of an electronic device according to an embodiment of the present disclosure.

FIG. 11 is a block diagram of an electronic device 800 according to an embodiment of the present disclosure. For example, the electronic device 800 may be a terminal such as a mobile phone, a computer, a digital broadcast terminal, a messaging device, a gaming console, a tablet, a medical device, exercise equipment, and a PDA.

Referring to FIG. 11, the electronic device 800 may include one or more of the following components: a processing component 802, a memory 804, a power component 806, a multimedia component 808, an audio component 810, an Input/Output (I/O) of interface 812, a sensor component 814, and a communication component 816.

The processing component 802 typically controls overall operations of the electronic device 800, such as the operations associated with display, telephone calls, data communications, camera operations, and recording operations. The processing component 802 may include one or more processors 820 to execute instructions to perform all or part of the operations in the above described methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the electronic device 800. Examples of such data include instructions for any applications or methods operated on the electronic device 800, contact data, phonebook data, messages, pictures, video, etc. The memory 804 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 806 provides power to various components of the electronic device 800. The power component 806 may include a power management system, one or more power sources, and any other components associated with the generation, management and distribution of power in the electronic device 800.

The multimedia component 808 includes a screen providing an output interface between the electronic device 800 and the user. In some embodiments, the screen may include a Liquid Crystal Display (LCD) and a Touch Panel (TP). If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the electronic device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a Microphone (MIC) configured to receive an external audio signal when the electronic device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, or buttons. The buttons may include, but are not limited to, a home button, a volume button, a starting button, and a locking button.

The sensor component 814 includes one or more sensors to provide status assessments of various aspects of the electronic device 800. For example, the sensor component 814 may detect an open/closed status of the electronic device 800, and relative positioning of components. For example, the component is the display and the keypad of the electronic device 800. The sensor component 814 may also detect a change in position of the electronic device 800 or a component of the electronic device 800, a presence or absence of user contact with the electronic device 800, an orientation or an acceleration/deceleration of the electronic device 800, and a change in temperature of the electronic device 800. The sensor component 814 may include a proximity sensor configured to detect the presence of nearby objects without any physical contact. The sensor component 814 may also include a light sensor, such as a Complementary Metal Oxide Semiconductor (CMOS) or Charge Coupled Device (CCD) image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate communication, wired or wirelessly, between the electronic device 800 and other devices. The electronic device 800 may access a wireless network based on a communication standard, such as WiFi, 2G or 3G, or a combination thereof. In one exemplary embodiment, the communication component 816 receives a broadcast signal or broadcast associated information from an external broadcast management system via a broadcast channel In one exemplary embodiment, the communication component 816 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the electronic device 800 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described methods.

In an exemplary embodiment, a non-volatile computer-readable storage medium, for example, a memory 804 including computer program instructions, is also provided. The computer program instructions may be executed by a processor 820 of an electronic device 800 to implement the above-mentioned method.

Figure 12:
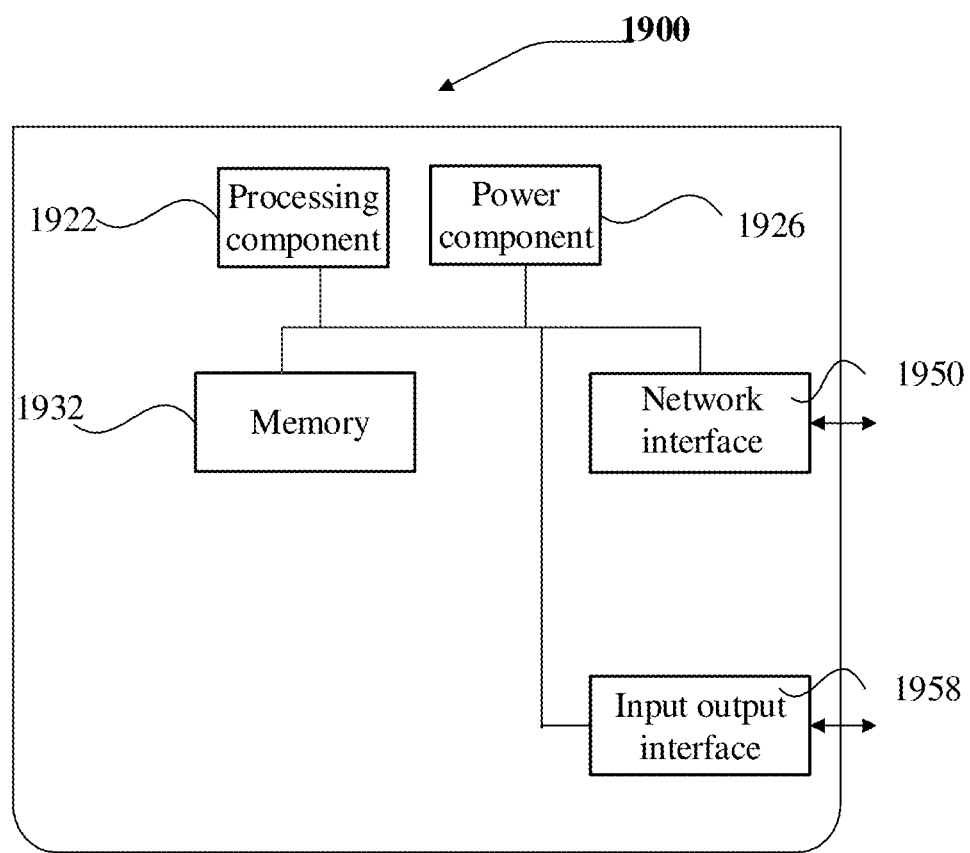
FIG. 12 illustrates a block diagram of an electronic device according to an embodiment of the present disclosure.

FIG. 12 is a block diagram of an electronic device 1900 according to an embodiment of the present disclosure. For example, the electronic device 1900 may be provided as a server. Referring to FIG. 12, the electronic device 1900 includes a processing component 1922, further including one or more processors, and a memory resource represented by a memory 1932, configured to store instructions executable by the processing component 1922, for example, an application program. The application program stored in the memory 1932 may include one or more modules, with each module corresponding to one group of instructions. In addition, the processing component 1922 is configured to execute the instruction to execute the above-mentioned method.

The electronic device 1900 may further include a power component 1926 configured to execute power management of the electronic device 1900, a wired or wireless network interface 1950 configured to connect the electronic device 1900 to a network and an I/O interface 1958. The electronic device 1900 may be operated based on an operating system stored in the memory 1932, for example, Windows Server™, Mac OS XTM, Unix™, Linux™, FreeBSD™ or the like.

In an exemplary embodiment, a non-volatile computer-readable storage medium, for example, a memory 1932 including computer program instructions, is also provided. The computer program instructions may be executed by a processing component 1922 of an electronic device 1900 to implement the above-mentioned method.

The present disclosure may include a system, a method and/or a computer program product. The computer program product may include a computer-readable storage medium, in which computer-readable program instructions configured to enable a processor to implement each aspect of the present disclosure is stored.

The computer-readable storage medium may be a physical device capable of retaining and storing instructions executable by an instruction execution device. The computer-readable storage medium may be, but not limited to, an electric storage device, a magnetic storage device, an optical storage device, an electromagnetic storage device, a semiconductor storage device or any appropriate combination thereof. More specific examples (non-exhaustive list) of the computer-readable storage medium include a portable computer disk, a hard disk, a Random Access Memory (RAM), a ROM, an EPROM (or a flash memory), an SRAM, a Compact Disc Read-Only Memory (CD-ROM), a Digital Video Disk (DVD), a memory stick, a floppy disk, a mechanical coding device, a punched card or in-slot raised structure with an instruction stored therein, and any appropriate combination thereof. Herein, the computer-readable storage medium is not explained as a transient signal, for example, a radio wave or another freely propagated electromagnetic wave, an electromagnetic wave propagated through a wave guide or another transmission medium (for example, a light pulse propagated through an optical fiber cable) or an electric signal transmitted through an electric wire.

The computer-readable program instruction described here may be downloaded from the computer-readable storage medium to each computing/processing device or downloaded to an external computer or an external storage device through a network such as an Internet, a Local Area Network (LAN), a Wide Area Network (WAN) and/or a wireless network. The network may include a copper transmission cable, an optical fiber transmission cable, a wireless transmission cable, a router, a firewall, a switch, a gateway computer and/or an edge server. A network adapter card or network interface in each computing/processing device receives the computer-readable program instruction from the network and forwards the computer-readable program instruction for storage in the computer-readable storage medium in each computing/processing device.

The computer program instruction configured to execute the operations of the present disclosure may be an assembly instruction, an Instruction Set Architecture (ISA) instruction, a machine instruction, a machine related instruction, a microcode, a firmware instruction, state setting data or a source code or target code edited by one or any combination of more programming languages, the programming language including an object-oriented programming language such as Smalltalk and C++ and a conventional procedural programming language such as "C" language or a similar programming language. The computer-readable program instruction may be completely or partially executed in a computer of a user, executed as an independent software package, executed partially in the computer of the user and partially in a remote computer, or executed completely in the remote server or a server. In a case involved in the remote computer, the remote computer may be connected to the user computer via an type of network including the LAN or the WAN, or may be connected to an external computer (such as using an Internet service provider to provide the Internet connection). In some embodiments, an electronic circuit, such as a programmable logic circuit, a Field Programmable Gate Array (FPGA) or a Programmable Logic Array (PLA), is customized by using state information of the computer-readable program instruction. The electronic circuit may execute the computer-readable program instruction to implement each aspect of the present disclosure.

Herein, each aspect of the present disclosure is described with reference to flowcharts and/or block diagrams of the method, device (system) and computer program product according to the embodiments of the present disclosure. It is to be understood that each block in the flowcharts and/or the block diagrams and a combination of each block in the flowcharts and/or the block diagrams may be implemented by computer-readable program instructions.

These computer-readable program instructions may be provided for a universal computer, a dedicated computer or a processor of another programmable data processing device, thereby generating a machine to further generate a device that realizes a function/action specified in one or more blocks in the flowcharts and/or the block diagrams when the instructions are executed through the computer or the processor of the other programmable data processing device. These computer-readable program instructions may also be stored in a computer-readable storage medium, and through these instructions, the computer, the programmable data processing device and/or another device may work in a specific manner, so that the computer-readable medium including the instructions includes a product including instructions for implementing each aspect of the function/action specified in one or more blocks in the flowcharts and/or the block diagrams.

These computer-readable program instructions may further be loaded to a computer, other programmable data processing devices or other devices, so that a series of operations can be executed in the computer, the other programmable data processing devices or the other devices to generate a process implemented by the computer to further realize the function/action specified in one or more blocks in the flowcharts and/or the block diagrams by the instructions executed in the computer, the other programmable data processing device or the other device.

The flowcharts and block diagrams in the drawings illustrate probably implemented system architectures, functions and operations of the system, method and computer program product according to multiple embodiments of the present disclosure. On this aspect, each block in the flowcharts or the block diagrams may represent part of a module, a program segment or an instruction, and part of the module, the program segment or the instruction includes one or more executable instructions configured to realize a specified logical function. In some alternative implementations, the functions marked in the blocks may also be realized in a sequence different from those marked in the drawings. For example, two continuous blocks may actually be executed in a substantially concurrent manner and may also be executed in a reverse sequence sometimes, which is determined by the involved functions. It is further to be noted that each block in the block diagrams and/or the flowcharts and a combination of the blocks in the block diagrams and/or the flowcharts may be implemented by a dedicated hardware-based system configured to execute a specified function or operation or may be implemented by a combination of a special hardware and a computer instruction.

Each embodiment of the present disclosure has been described above. The above descriptions are exemplary, non-exhaustive and also not limited to each embodiment. Many modifications and variations are apparent to those of ordinary skill in the art without departing from the scope and spirit of each described embodiment of the present disclosure. The terms used herein are selected to explain the principle and practical application of each embodiment or technical improvements in the technologies in the market best or enable others of ordinary skill in the art to understand each embodiment herein.

The invention claimed is:

1. A method for image processing, comprising:
   identifying a first object to be rendered in a target image and a second object to which the first object belongs in the target image, wherein the second object includes the first object;
   generating a reference image comprising a mark based on the target image and the second object, the mark being used for recording a coverage area of the second object;
   determining an area to be rendered based on the reference image and the first object, the area to be rendered being located within the coverage area corresponding to the mark; and
   rendering the area by utilizing a target material to generate a rendering result,
   wherein generating the reference image comprising the mark based on the target image and the second object comprises:
      generating a first initial image with a same size as the target image; and
      changing, in the first initial image, at least one pixel comprised in the coverage area of the second object into a target pixel value to obtain the reference image,
   wherein the first initial image is a blank image.

2. The method according to claim 1, wherein determining the area to be rendered based on the reference image and the first object comprises:
   generating a second initial image with a same size as the target image; and
   determining the area to be rendered in the second initial image based on the reference image and the first object,
   wherein the second initial image is an image other than the blank image.

3. The method according to claim 2, wherein determining the area to be rendered in the second initial image based on the reference image and the first object comprises:
   taking, in the second initial image, an area corresponding to the first object as an initial area to be rendered;
   traversing pixels of the initial area to be rendered, and when corresponding positions of the pixels in the reference image comprise the mark, taking the pixels as pixels to be rendered; and
   taking an area formed by the pixels to be rendered as the area to be rendered.

4. The method according to claim 1, wherein identifying the first object to be rendered in the target image and the second object to which the first object belongs in the target image comprises:
   extracting features from the target image to respectively obtain a first feature point set corresponding to the first object and a second feature point set corresponding to the second object;
   connecting first feature points comprised in the first feature point set in a first preset manner to obtain an area corresponding to the first object; and
   connecting second feature points comprised in the second feature point set in a second preset manner to obtain an area corresponding to the second object.

5. The method according to claim 4, wherein connecting the first feature points comprised in the first feature point set in the first preset manner to obtain the area corresponding to the first object comprises:
   dividing the first feature point set by taking at least three first feature points as a group to obtain at least one subset of first feature points;
   sequentially connecting the first feature points comprised in the at least one subset of first feature points to obtain at least one first mesh; and
   taking an area covered by the at least one first mesh as the area corresponding to the first object.

6. The method according to claim 4, wherein connecting the second feature points comprised in the second feature point set in the second preset manner to obtain the area corresponding to the second object comprises:
   dividing the second feature point set by taking at least three second feature points as a group to obtain at least one subset of second feature points;
   sequentially connecting the second feature points comprised in the at least one subset of second feature points to obtain at least one second mesh; and taking an area covered by the at least one second mesh as the area corresponding to the second object.

7. The method according to claim 1, further comprising:
changing transparency of the target image to obtain a change result; and
fusing the rendering result with the change result to obtain a fused image.

8. The method according to claim 1, wherein the first object comprises a pupil, the second object comprises an eye, and the target material comprises a material for beautifying the pupil.

9. A computer program, comprising computer-readable codes, wherein when the computer-readable codes run in an electronic device, a processor in the electronic device executes the method of claim 1.

10. An apparatus for image processing, comprising:
a processor; and
a memory configured to store instructions executable by the processor;
wherein the processor is configured to:
identify a first object to be rendered in a target image and a second object to which the first object belongs in the target image, wherein the second object includes the first object;
generate a reference image comprising a mark based on the target image and the second object, the mark being used for recording a coverage area of the second object;
determine an area to be rendered based on the reference image and the first object, the area to be rendered being located within the coverage area corresponding to the mark; and
render the area by utilizing a target material to generate a rendering result,
wherein the processor is further configured to:
generate a first initial image with a same size as the target image; and
change, in the first initial image, at least one pixel comprised in the coverage area of the second object into a target pixel value to obtain the reference image,
wherein the first initial image is a blank image.

11. The apparatus according to claim 10, wherein the processor is configured to:
generate a second initial image with a same size as the target image; and
determine the area to be rendered in the second initial image based on the reference image and the first object,
wherein the second initial image is an image other than the blank image.

12. The apparatus according to claim 11, wherein the processor is further configured to:

take, in the second initial image, an area corresponding to the first object as an initial area to be rendered;
traverse pixels of the initial area to be rendered, and when corresponding positions of the pixels in the reference image comprise the mark, take the pixels as pixels to be rendered; and
take an area formed by the pixels to be rendered as the area to be rendered.

13. The apparatus according to claim 10, wherein the processor is configured to:
extract features from the target image to respectively obtain a first feature point set corresponding to the first object and a second feature point set corresponding to the second object;
connect first feature points comprised in the first feature point set in a first preset manner to obtain an area corresponding to the first object; and
connect second feature points comprised in the second feature point set in a second preset manner to obtain an area corresponding to the second object.

14. The apparatus according to claim 10, wherein the first object comprises a pupil, the second object comprises an eye, and the target material comprises a material for beautifying the pupil.

15. A computer-readable storage medium, storing computer program instructions thereon that, when executed by a processor, implement operations comprising:
identifying a first object to be rendered in a target image and a second object to which the first object belongs in the target image, wherein the second object includes the first object;
generating a reference image comprising a mark based on the target image and the second object, the mark being used for recording a coverage area of the second object;
determining an area to be rendered based on the reference image and the first object, the area to be rendered being located within the coverage area corresponding to the mark; and
rendering the area by utilizing a target material to generate a rendering result,
wherein generating the reference image comprising the mark based on the target image and the second object comprises:
generating a first initial image with a same size as the target image; and
changing, in the first initial image, at least one pixel comprised in the coverage area of the second object into a target pixel value to obtain the reference image,
wherein the first initial image is a blank image.

* * * * *